Patented Feb. 6, 1945

2,369,110

UNITED STATES PATENT OFFICE 2,369,110

PROCESS FOR PELLETING UREA

Edward F. Harford, Arden, Del., assignor to E. I. du Pont de Nemours & Company, Wilmington, Del., a corporation of Delaware No Drawing. Application July 20, 1940,
Serial No. 346,523

3 Claims. (Cl. 71—64)

This invention relates to the granulation of fertilizers and more particularly to the production of urea in an improved granular form.

Previously, methods have been proposed for the preparation of fertilizers in a granular or pelleted form in which they can be readily handled and efficiently applied to the soil. These prior processes have involved various steps such as grinding, shredding, and compressing solids and magma spraying and graining of heated liquid fertilizer compositions in order to provide relatively finely divided particles. In the case of the grinding and shredding processes, further steps have ordinarily been used involving moistening or rolling, or both, to conglomerate the small particles into pellets or granules.

These pelleting or granulating operations have been successful in varying degree where mixtures of substances have been treated but where relatively pure, dry crystalline materials such as urea, or such material as urea when admixed with small percentages of water-insoluble material such as finely ground limestone, phosphate rock and the like have been treated the prior proposals are not satisfactory, their prime disadvantage being that the pellets or granules so formed are not strong and rapidly disintegrate upon handling.

It is an object of the present invention to overcome the disadvantages of the prior proposals and to provide a new and improved method for granulation of urea-containing mixtures.

It is a further object of this invention to provide a new and improved method for pelleting or granulating relatively pure crystalline urea alone or admixed with water-insoluble but fertilizer-useful mineral powders, such as dolomite, phosphate rock, calcium carbonate and the like.

Other objects and advantages of the invention will be apparent from the following specification in which the preferred embodiments and details of the invention are described.

According to the present invention urea and mixtures containing urea in admixture with water-insoluble mineral powders such as rock phosphate and dolomite are granulated to give good yields of pellets or granules of uniform size by intimately mixing relatively small amounts of starch in the presence of water, with the urea or urea, containing mixture which it is desired to granulate. Preferably this granulation is effected by rotating the mixture of urea and starch, as described, in a revolving drum which may or may not contain lifts.

I have discovered that starch has the property of gelatinizing in the presence of urea, which contains small amounts of water or to which small amounts of water have been added, at room temperature and that when starch is intimately mixed under these conditions with urea at normal temperatures a plastic mass is achieved which is a much better granulation agent or medium than any mixture containing no starch. Although the explanation should not be taken as a limitation upon the scope of the invention, it is believed that the small amount of starch, when gelatinized in the presence of water upon addition to urea, makes a large volume of viscous liquid which fills the voids between the crystals of the urea being granulated. As a consequence, the whole resultant mass rapidly reaches the desired plastic state, in which small balls, pellets or granules are readily formed as the plastic mass is rotated or tumbled, such as effected in a revolving drum. It has also been discovered that, on drying, the starch acts as a binding agent thereby greatly increasing the strength of the granules.

Following addition of starch and water, if there is not sufficient moisture present in the urea, or urea-containing mixture, the process of mixing and granulation is preferably carried out in a revolving horizontal cylinder. The amount of starch used for granulation may vary over a wide range but the quantities required are surprisingly small, between 1% and 3% starch, based upon the weight of the material being treated, being sufficient for successful granulation. Similarly, the amounts of water utilized are small, between 2 and 4% water being the preferred concentrations, the exact amounts of water, as well as starch, depending upon the original particle size of the urea being treated.

The range in proportions of urea and mineral powders, such as rock phosphate and dolomite and the like is wide, as much as 20% by weight of mineral powder being successfully utilized, although smaller quantities, such as in the range of 5 to 15% are preferred. Furthermore, it may also be preferred to add small quantities of various conditioning agents such as cocoa shell, castor bean or peanut hull meals or other fibrous material. About 1% by weight of these meals is preferred, although a range between 0.5 and 3% may be satisfactorily employed.

In preferred operation of this invention, the urea or urea-dolomite mixture to be treated is introduced into a revolving horizontal cylinder and thereafter mixed with between 1 and 3% starch, based upon the weight of the urea or mixture containing urea. The mixture of starch and urea may be, if preferred, carried on before introduction of the urea to the horizontal cylinder. Thereafter, 2 to 4% steam or hot water, based upon the weight of the urea, is added until the temperature of the mass is approximately 70° C., at which point the rotating, agitated mass within the revolving horizontal cylinder becomes quite plastic and forms into small balls. These resultant balls or granules are sufficiently strong to withstand the drying operations in a rotary drier, as well as normal handling.

Granule yields of 90% between 5 and 35 mesh, (0.131 to 0.0164 inch diameter) have been obtained according to this invention in granulating urea which had a screen analysis of 15% plus 40 mesh; 70% minus 40 mesh and plus 100 mesh; and 15% minus 100 mesh.

The following examples will illustrate how the present invention may be practiced.

Example 1

Into a common fertilizer mixer comprising a revolving horizontal cylinder there was introduced:

|  | Pounds |
|---|---|
| Urea containing 3% water | 1,950 |
| Starch | 50 |
| Total dry weight | 2,000 |

To this mixture between 3 and 4% steam was added until the temperature reached 70° C. At this temperature the mass became quite plastic and, during agitation within the revolving horizontal cylinder small pellets or granules of the urea formed as this mixture was rotated. The cylinder was rotated for 3 minutes at a temperature of 70° C. and at the expiration of this time, upon removal of the granulated mixture from the horizontal cylinder and drying in a steam-heated rotary drier until the moisture content was 0.5% there resulted a granular fertilizer mixture containing 90% of granules between 6 and 35 mesh, the remaining 10% being plus 6 mesh.

Example 2

Into a fertilizer mixer such as described in Example 1 is introduced:

|  | Pounds |
|---|---|
| Urea containing 3% water | 1,500 |
| Starch | 50 |
| Coca shell meal | 50 |
| Dolomite | 400 |

This mixture is treated as described in Example 1 with substantially the same results, i. e. to obtain a granular fertilizer mixture containing about 90% of granules between 6 and 35 mesh, the remaining 10% being plus 6 mesh.

Various changes may be made in the details and preferred embodiments of this invention without departing therefrom or sacrificing any of its advantages.

I claim:

1. A process for pelleting crystalline urea to give granules having a particle size between 0.131 and 0.0164 inch in diameter which comprises the sequence of steps in order: (1) incorporating from 1 to 3% starch with urea containing from 2 to 4% water, the percentage of starch and water being based on the weight of urea; (2) thereafter heating and tumbling the resulting mass to render it plastic and to gelatinize the starch; (3) continuing said heating and tumbling until pellets ranging in sizes from 0.131 to 0.0164 inch in diameter are formed; and (4) finally drying the resulting product.

2. A process for pelleting crystalline urea to give granules having a particle size between 0.131 and 0.0164 inch in diameter which comprises the sequence of steps in order: (1) incorporating from 1 to 3% starch with urea containing from 2 to 4% water, the percentage of starch and water being based on the weight of urea; (2) thereafter heating and tumbling the resulting mass at a temperature above 70° C. to render it plastic and to gelatinize the starch; (3) continuing said heating and tumbling until pellets ranging in size from 0.131 to 0.0164 inch in diameter are formed; and (4) finally drying the resulting product.

3. A new article of manufacture, physically strong granules of crystalline urea, ranging in size from 0.131 to 0.0164 inch in diameter, and containing from 1 to 3% by weight of starch based on the weight of urea.

EDWARD F. HARFORD.